U. E. G. JOHNSON.
WHEEL PULLER.
APPLICATION FILED APR. 10, 1920.
1,412,058.
Patented Apr. 11, 1922.
2 SHEETS—SHEET 2.
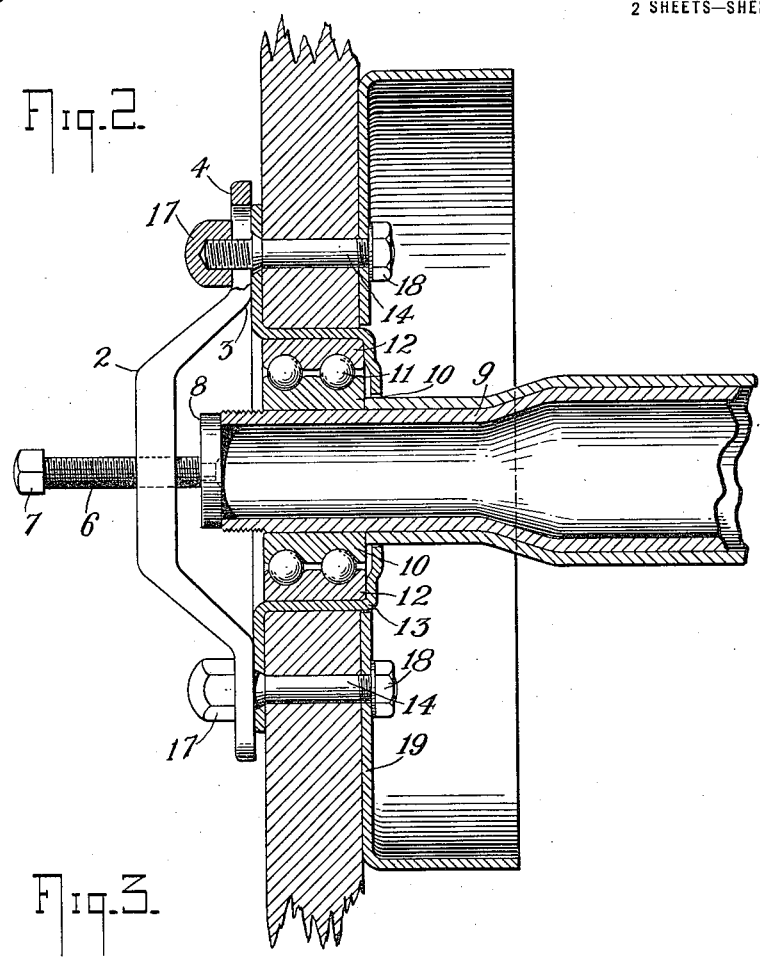
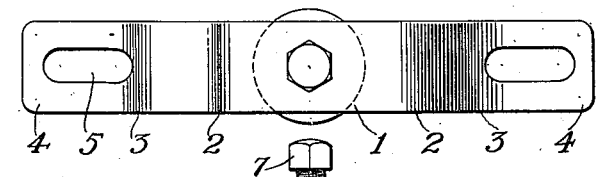
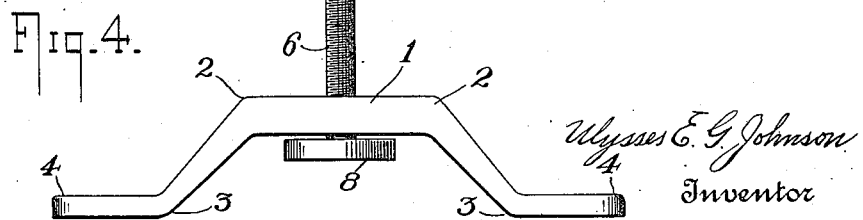
Ulysses E. G. Johnson
Inventor
By his Attorney
Emerson R. Newell

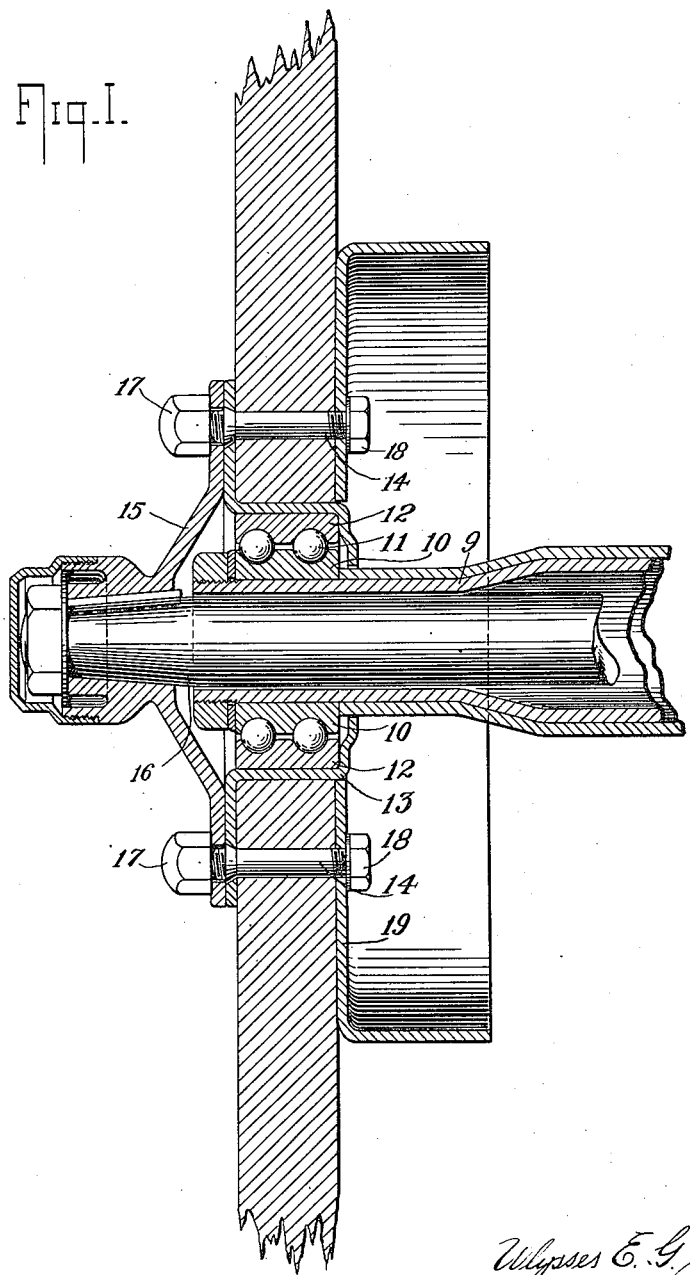

UNITED STATES PATENT OFFICE.

ULYSSES E. G. JOHNSON, OF PITTSFIELD, MASSACHUSETTS.

WHEEL PULLER.

1,412,058.  Specification of Letters Patent.  Patented Apr. 11, 1922.

Application filed April 10, 1920. Serial No. 372,964.

*To all whom it may concern:*

Be it known that I, ULYSSES E. GRANT JOHNSON, a citizen of the United States, residing at Pittsfield, in the county of Berkshire and State of Massachusetts, have invented certain new and useful Improvements in Wheel Pullers, of which the following is a clear, full, and exact description.

This invention relates to a wheel pulling tool for use in removing the rear wheels of automobiles having what is known as a full floating type of axle, and an object of the invention is the provision of a tool of the simplest possible construction, yet one which is very efficient in use.

To this end a feature of the invention relates to the construction of a wheel puller whereby the usual wheel bolts and studs for securing the axle to the wheel are utilized for securing the wheel puller to the wheel, thus doing away with the necessity of providing separate devices for this purpose. A further feature relates to the provision of a wheel puller having a movable member engaging directly with the axle bushing.

Other features and advantages will become apparent from the following detailed description and claims when taken in connection with the accompanying drawings, in which—

Fig. 1 is a central sectional view through a wheel mounting showing the axle in place;

Fig. 2 is a similar view but with the axle removed and my improved puller in place upon the wheel;

Fig. 3 is an enlarged rear elevation of the tool; and

Fig. 4 is an enlarged side elevation thereof.

Referring to the drawings, the wheel puller comprises a bar of metal having a central portion 1, said bar being bent at 2 and again at 3, the ends 4 being parallel with the main portion 1 and offset therefrom. The ends 4 are provided with slots 5, which slots are adapted, when the wheel puller is in place on the wheel, to engage over the ends of the usual bolts which secure the axle to the wheel and the distance between the slotted ends of the puller is such that it will conveniently fit over two diametrically opposite bolts. The wheel puller is also provided with a screw 6 engaging through an aperture in the center of the main portion 1, said screw having a head 7 which may be of hexagonal form, and a member 8 in the form of a disk adapted when the wheel puller is in place to engage the end of the axle bushing.

As shown in Fig. 1, the wheel of the automobile is supported on a bushing 9 by inner ball races 10 which tightly engage the bushing. Balls 11 are interposed between the inner ball races 10 and outer ball races 12, members 13 being provided outside of the outer ball races, these members having holes through which the bolts 14 pass. These bolts 14 also pass through a flange 15 secured to the axle 16 and are provided with nuts 17 engaging the screw-threaded ends of the bolts. The opposite ends of the bolts are also screw threaded and are engaged by the usual nuts 18 engaging the inner surface of the brake drum 19.

When it is desired to remove the wheel, the nuts 17 are first taken off and the axle removed. The wheel puller is then placed so that its slotted ends engage over the ends of opposite bolts 14, the puller being securely clamped to the wheel by means of the nuts 17, as shown in Fig. 2. The member 8 is adjusted to position to engage the end of the bushing 9. Turning of the screw will result in a pull being exerted on the wheel through the bolts and the same, together with the ball races and balls, will be removed. It is of course understood that the ends 4 of the puller are sufficiently offset so that there is a slight clearance between the member 8 and the end of the bushing 9 when the wheel puller is secured in place on the bolts 14.

While I have shown and described a particular form my invention may take, it is of course understood that variations may be resorted to within the spirit of the invention and that the claims are to be interpreted accordingly.

What I claim as new is—

1. A wheel puller applicable to a wheel having a full floating type axle in which the axle is contained within a stationary axle bushing and bolted to the wheel by bolts having threaded projecting ends, said puller comprising a main portion and apertured offset end portions by which it is adapted to receive and be secured to the said threaded ends of the axle-securing bolts after removal of the axle, and means carried by said main portion and of a size adapted to engage said axle bushing and operable to force said wheel therefrom.

2. A wheel puller for use with a full floating type axle in which the axle is bolted to the wheel and secured by nuts and in which the wheel engages a bushing through which the axle passes, said puller having a main portion and offset apertured end portions, said end portions being spaced apart so that the apertures therein may engage the axle-securing bolts when the wheel puller is in place and after removal of the axle, said wheel puller adapted to be secured in place on the wheel by said nuts, and means carried by said main portion adapted to engage and press against the axle bushing to remove the wheel therefrom.

Signed at Pittsfield, Mass., this 8" day of April 1920.

ULYSSES E. G. JOHNSON.

Witnesses:
RAYMOND D. TUFTS,
GEO. H. SOUTHARD, Jr.